(12) United States Patent
Kamimaru et al.

(10) Patent No.: US 10,698,600 B2
(45) Date of Patent: Jun. 30, 2020

(54) THUMBNAIL IMAGE DISPLAY APPARATUS AND CONTROL METHOD OF THUMBNAIL IMAGE DISPLAY APPARATUS

(71) Applicant: PFU LIMITED, Kahoku-shi, Ishikawa (JP)

(72) Inventors: Shinichiro Kamimaru, Kahoku (JP); Mitsuhiro Katsuizumi, Kahoku (JP)

(73) Assignee: PFU LIMITED, Kahoku-Shi, Ishikawa (JP)

( * ) Notice: Subject to any disclaimer, the term of this patent is extended or adjusted under 35 U.S.C. 154(b) by 186 days.

(21) Appl. No.: 15/615,640

(22) Filed: Jun. 6, 2017

(65) Prior Publication Data
US 2018/0267703 A1    Sep. 20, 2018

(30) Foreign Application Priority Data

Mar. 17, 2017   (JP) ................................. 2017-052763

(51) Int. Cl.
*G06F 3/0485*    (2013.01)
*G06F 3/0488*    (2013.01)
(Continued)

(52) U.S. Cl.
CPC ........ *G06F 3/04883* (2013.01); *G06F 3/0485* (2013.01); *G06F 3/0486* (2013.01);
(Continued)

(58) Field of Classification Search
None
See application file for complete search history.

(56) References Cited

U.S. PATENT DOCUMENTS

| | | | |
|---|---|---|---|
| 2011/0087997 A1* | 4/2011 | Lee | G06F 3/0482 715/830 |
| 2012/0096376 A1* | 4/2012 | Hibi | G06F 3/03545 715/765 |

(Continued)

FOREIGN PATENT DOCUMENTS

| | | |
|---|---|---|
| JP | 11-252484 A | 9/1999 |
| JP | 2000-172401 A | 6/2000 |

(Continued)

OTHER PUBLICATIONS

Japanese Office Action dated Jul. 25, 2018 regarding Japanese Patent Application No. 2017-052763 corresponding to U.S. Appl. No. 15/615,640 (4 pages) with English Translation (3 pages).

(Continued)

*Primary Examiner* — Nhat Huy T Nguyen
(74) *Attorney, Agent, or Firm* — Lewis Roca Rothgerber Christie LLP

(57) ABSTRACT

The thumbnail image display apparatus includes a display, a detector for detecting an operation including a touch operation and a pan operation performed by a user with the display, a storage for storing a plurality of thumbnail images that can be displayed on the display and identifiers respectively corresponding to the thumbnail images in such a manner that the thumbnail images and the identifiers are associated with each other, and a controller, wherein the controller changes the identifier in accordance with a movement information of the pan operation and displays the identifier on the display, when the detector detects the pan operation upon detecting the touch operation, and the controller reads, from the storage, the thumbnail image corresponding to the identifier displayed on the display and displays the thumbnail image on the display, when the detector detects an end of the pan operation.

6 Claims, 14 Drawing Sheets

(51) Int. Cl.
*G06F 3/01* (2006.01)
*G06F 3/0481* (2013.01)
*G06F 16/901* (2019.01)
*G06F 3/0486* (2013.01)
*G06F 3/0484* (2013.01)

(52) U.S. Cl.
CPC ...... *G06F 3/04845* (2013.01); *G06F 16/9027* (2019.01); *G06F 2203/04806* (2013.01)

(56) References Cited

U.S. PATENT DOCUMENTS

| | | | | |
|---|---|---|---|---|
| 2012/0136892 | A1* | 5/2012 | Ajima | G06F 16/338 |
| | | | | 707/769 |
| 2012/0206498 | A1* | 8/2012 | Kai | G06F 3/0482 |
| | | | | 345/684 |
| 2014/0053066 | A1* | 2/2014 | Imamura | G06F 3/0483 |
| | | | | 715/251 |
| 2015/0127674 | A1 | 5/2015 | Ito | |

FOREIGN PATENT DOCUMENTS

| | | |
|---|---|---|
| JP | 2012-168790 A | 9/2012 |
| JP | 2012-230570 A | 11/2012 |
| JP | 2013-235618 A | 11/2013 |
| JP | 2015-88119 A | 5/2015 |

OTHER PUBLICATIONS

Japanese Office Action dated Mar. 6, 2018 regarding Japanese Patent Application No. 2017-052763 corresponding to U.S. Appl. No. 15/615,640 (3 pages) with English Translation (5 pages).
English abstract and machine translation for Japanese Patent Application No. 2000-172401 A.

* cited by examiner

| IDENTIFIER | FILENAME OF THUMBNAIL IMAGE |
|---|---|
| 1 | 1.jpg |
| 2 | 2.jpg |
| 3 | 3.jpg |
| .. | ... |

FIG. 9
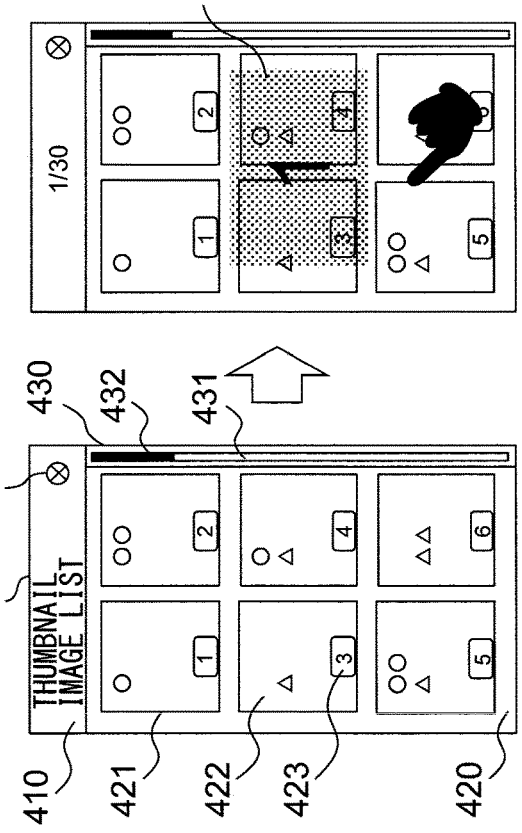
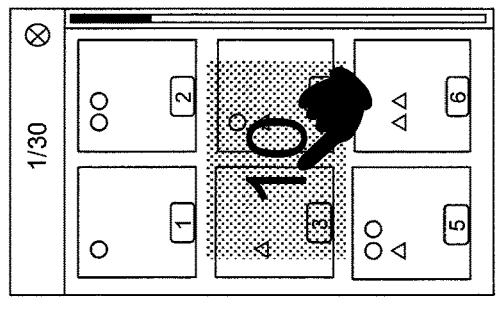
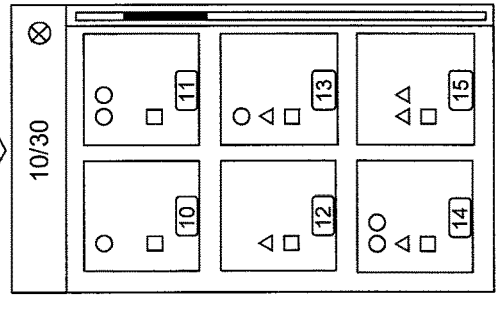
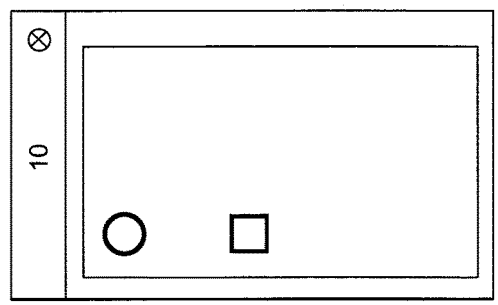

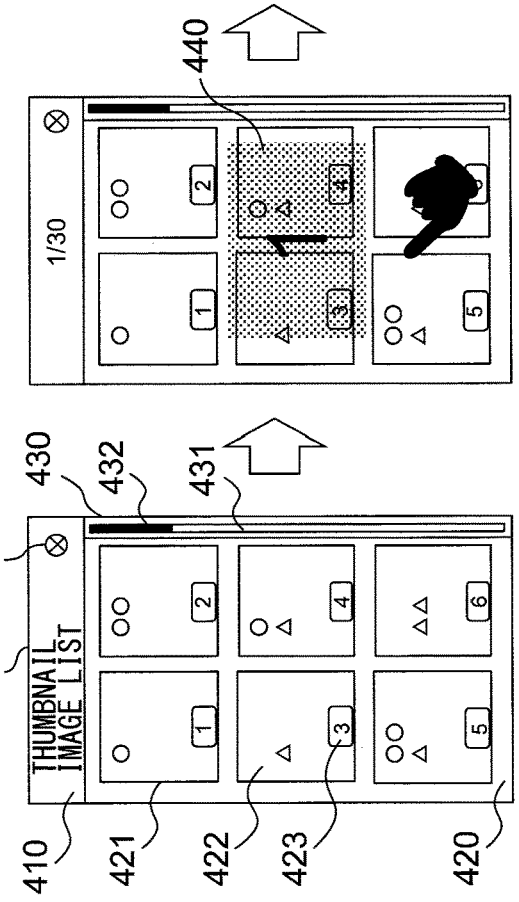
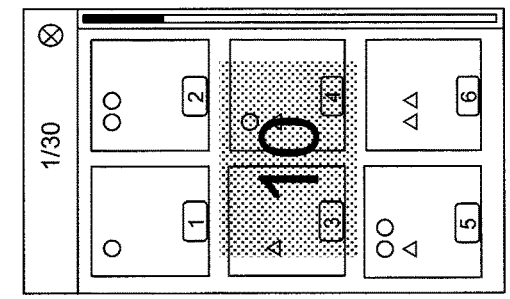
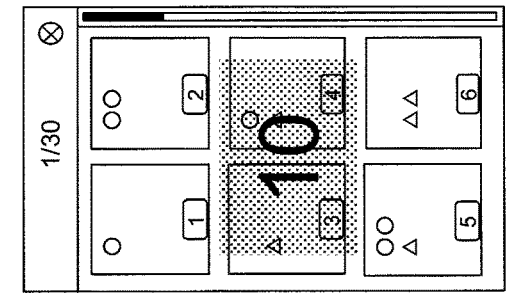
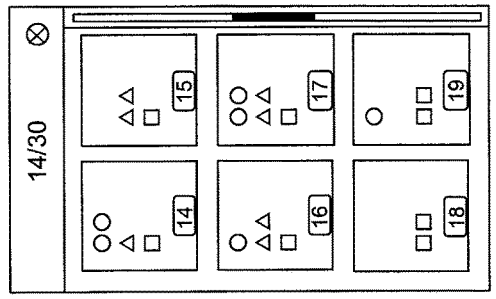
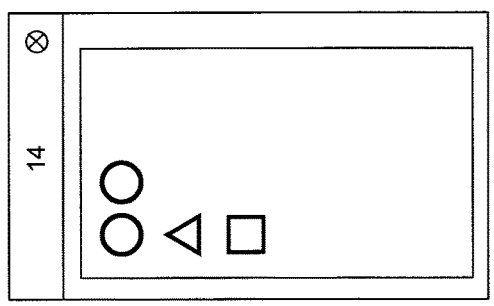
FIG. 10

FIG. 11
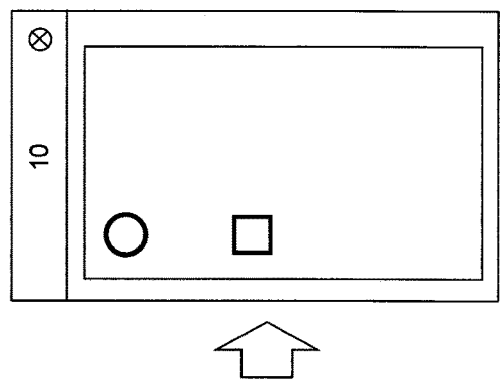
STEP 11e
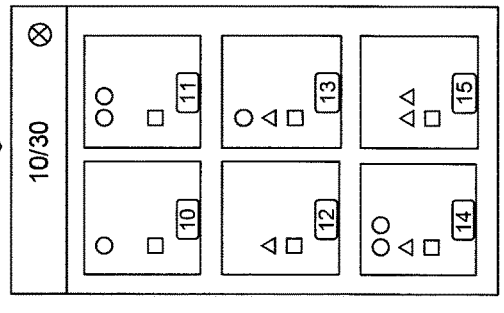
STEP 11d
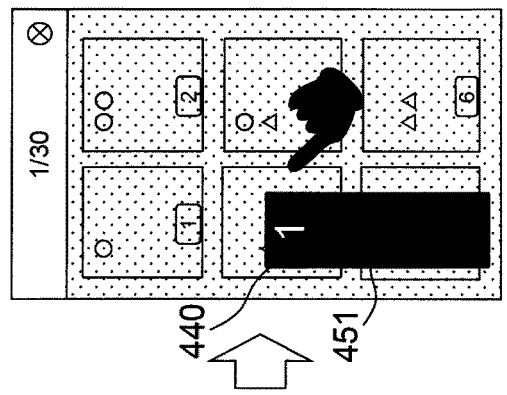
STEP 11c
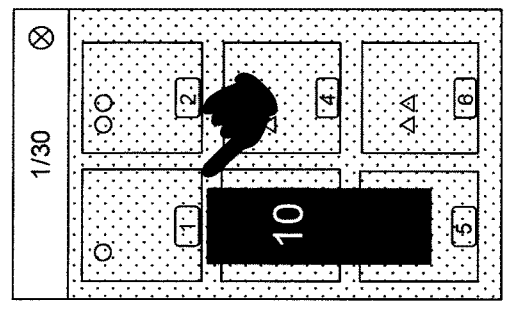
STEP 11b
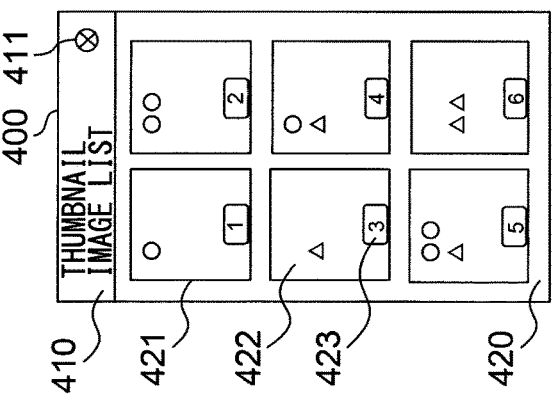
STEP 11a FIG. 13
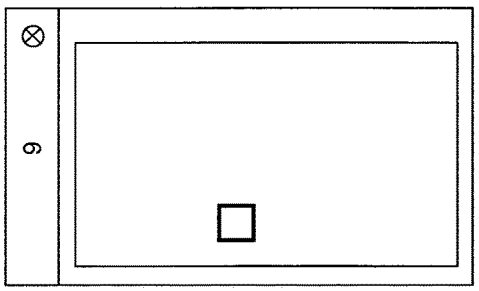
STEP 13e
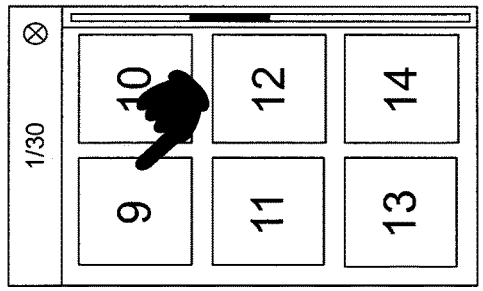
STEP 13c
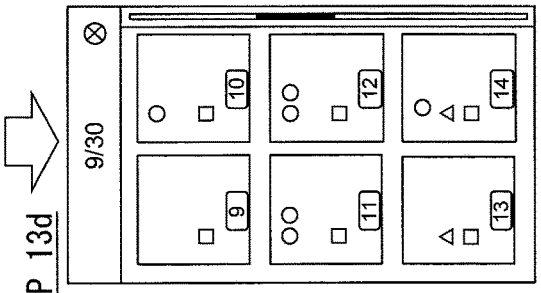
STEP 13d
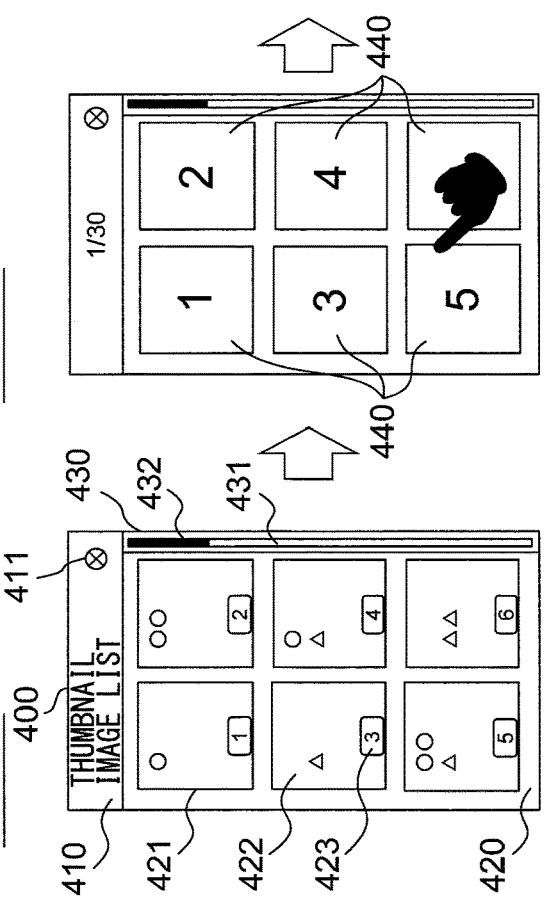
STEP 13b
STEP 13a

THUMBNAIL IMAGE DISPLAY APPARATUS AND CONTROL METHOD OF THUMBNAIL IMAGE DISPLAY APPARATUS

CROSS-REFERENCE TO RELATED APPLICATIONS

This application is based upon and claims the benefit of priority of prior Japanese Patent Application No. 2017-052763, filed on Mar. 17, 2017, the entire contents of which are incorporated herein by reference.

TECHNICAL FIELD

Embodiments discussed in the present specification relate to a thumbnail image display apparatus and a control method of a thumbnail image display apparatus.

BACKGROUND

In order to find a desired image from multiple images, a technique has been developed to display images smaller than the desired image (thumbnail images) and select the desired image. Japanese Unexamined Patent Publication No. H11-252484 discloses a technique for finding and selecting a desired image by displaying small images in a screen and scrolling through the screen.

SUMMARY

When new thumbnail images are displayed in conjunction with scrolling, processing may be performed to load thumbnail image data to a virtual screen (to memory) in advance and change a display range of the virtual screen in accordance with a key operation, a flick operation, etc. However, in order to do this, it is necessary to load not only the image data of displayed thumbnail images but also the image data before and after the image data of displayed thumbnail images to the memory, and therefore, this technique may not be implemented on a device having a small memory capacity such as an embedded device.

It is an object of the embodiments to provide a thumbnail image display apparatus and a control method of the thumbnail image display apparatus capable of displaying thumbnails in a preferable manner even with a small memory capacity.

According to an aspect of the apparatus, there is provided a thumbnail image display apparatus. The thumbnail image display apparatus includes a display, a detector for detecting an operation including a touch operation and a pan operation performed by a user with the display, a storage for storing a plurality of thumbnail images that can be displayed on the display and identifiers respectively corresponding to the thumbnail images in such a manner that the thumbnail images and the identifiers are associated with each other, and a controller for displaying, on the display, an identifier corresponding to any one of displayed thumbnail images without changing the thumbnail images displayed on the display when the detector detects the touch operation and a movement from a touch position by a certain distance, wherein the controller changes the identifier in accordance with a movement information of the pan operation and displays the identifier on the display, when the detector detects the pan operation upon detecting the touch operation, and the controller reads, from the storage, the thumbnail image corresponding to the identifier displayed on the display and displays the thumbnail image on the display, when the detector detects an end of the pan operation.

According to an aspect of the apparatus, there is provided another thumbnail image display apparatus. The thumbnail image display apparatus includes a display, a detector for detecting an operation including a touch operation and a pan operation performed by a user with the display, a storage for storing a plurality of thumbnail images that can be displayed on the display and identifiers respectively corresponding to the thumbnail images in such a manner that the thumbnail images and the identifiers are associated with each other, and a controller for switching a display of the thumbnail image displayed on the display to a display of only the identifier corresponding to the thumbnail image and displaying the identifier on the display, when the detector detects the touch operation and a movement from a touch position by a certain distance, wherein the controller changes the identifier in accordance with a movement information of the pan operation and displays the identifier on the display, when the detector detects the pan operation upon detecting the touch operation, and the controller reads, from the storage, the thumbnail image corresponding to the identifier displayed on the display and displays the thumbnail image on the display, when the detector detects an end of the pan operation.

According to an aspect of the method, there is provided a control method executed by a thumbnail image display apparatus. The control method includes storing a plurality of thumbnail images that can be displayed on the display and identifiers respectively corresponding to the thumbnail images in such a manner that the thumbnail images and the identifiers are associated with each other, detecting an operation including a touch operation and a pan operation performed by a user with the display, displaying, on the display, an identifier corresponding to any one of displayed thumbnail images without changing the thumbnail images displayed on the display when the touch operation and a movement from a touch position by a certain distance are detected, changing the identifier in accordance with a movement information of the pan operation and displaying the identifier on the display, when the pan operation is detected upon detecting the touch operation, and displaying, on the display, the thumbnail image corresponding to the identifier displayed on the display, when an end of the pan operation is detected.

According to an aspect of the method, there is provided another control method executed by a thumbnail image display apparatus. The control method includes storing a plurality of thumbnail images that can be displayed on the display and identifiers respectively corresponding to the thumbnail images in such a manner that the thumbnail images and the identifiers are associated with each other, detecting an operation including a touch operation and a pan operation performed by a user with the display, switching a display of the thumbnail image displayed on the display to a display of only the identifier corresponding to the thumbnail image and displaying the identifier on the display, when the touch operation and a movement from a touch position by a certain distance are detected, changing the identifier in accordance with a movement information of the pan operation and displaying the identifier on the display, when the pan operation is detected upon detecting the touch operation, and displaying, on the display, the thumbnail image corresponding to the identifier displayed on the display, when an end of the pan operation is detected.

The object and advantages of the invention will be realized and attained by means of the elements and combinations particularly indicated in the claims. It is to be understood that both the foregoing general description and the following detailed description are exemplary and explanatory, and are not restrictive of the invention, as claimed.

BRIEF DESCRIPTION OF THE DRAWINGS

FIG. 9 is a figure illustrating an example of transition of the display screen 400 in conjunction with a pan operation;

FIG. 10 is a figure illustrating an example of transition of the display screen 400 in conjunction with a flick operation;

FIG. 11 is a figure illustrating an example of transition of the display screen 400 in conjunction with a pan operation;

FIG. 13 is a figure illustrating an example of transition of the display screen 400 in conjunction with a pan operation;

DESCRIPTION OF EMBODIMENTS

A thumbnail image display apparatus, a control method of the thumbnail image display apparatus, and a control program of a computer according to embodiments will be hereinafter explained with reference to drawings. However, it should be noted that the technical scope of the present invention is not limited to these embodiments, and also covers the invention described in the claims and its equivalents.

First Embodiment

Figure 1:
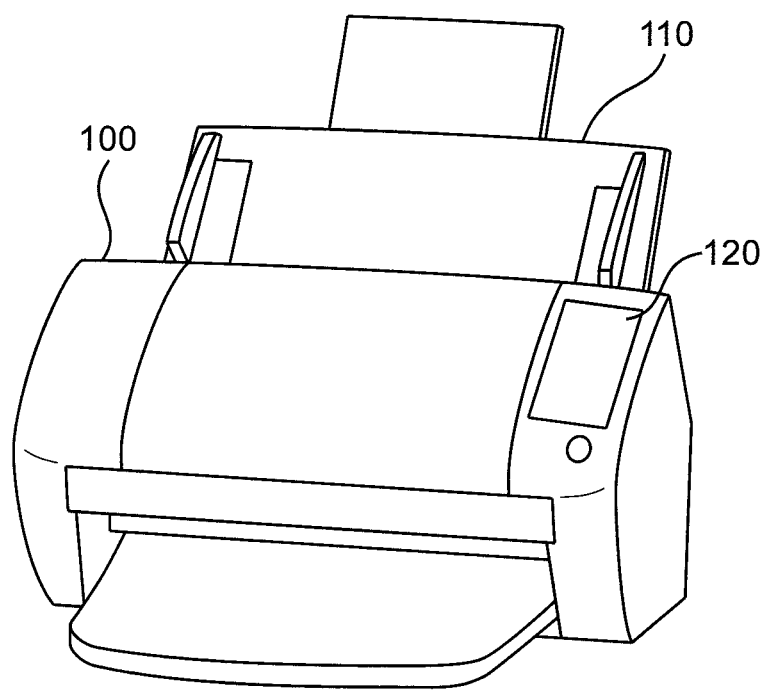
FIG. 1 is an example of a perspective view illustrating a thumbnail image display apparatus 100.

FIG. 1 is an example of a perspective view illustrating a thumbnail image display apparatus 100.

The thumbnail image display apparatus 100 includes a document platen 110, a display apparatus 120, etc. In the present embodiment, a scanner is used as an example, and processing for selecting a scanned (captured) image with thumbnails will be mainly explained.

The document platen 110 is a table on which multiple documents to be imaged (scanned) can be placed. The display apparatus 120 is an example of a display. The display apparatus 120 includes a display made of a liquid crystal display, an organic EL (Electro-Luminescence) display, etc., and an interface circuit for outputting image data to the display, and displays image data on the display.

Figure 2:
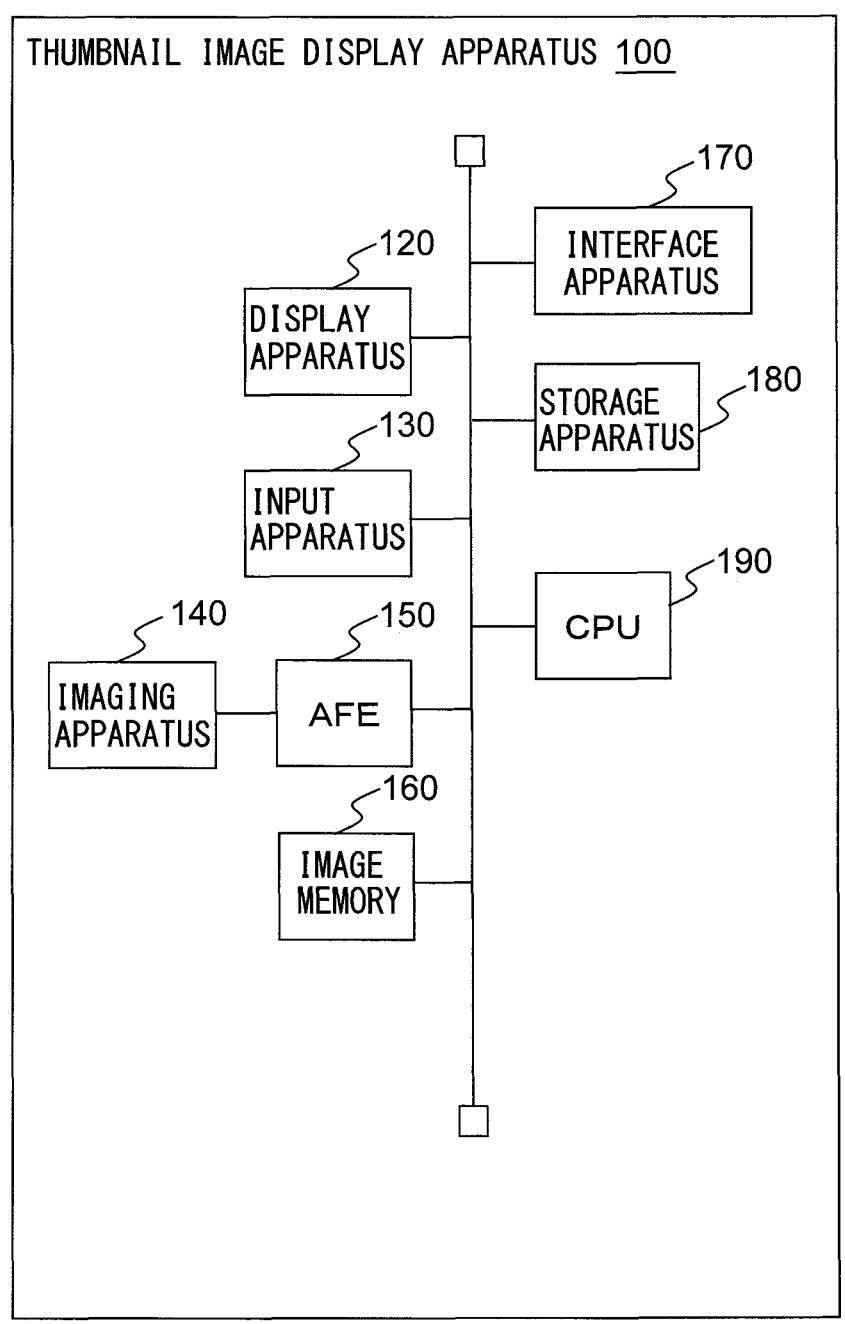
FIG. 2 is a figure illustrating an example of a schematic configuration of the thumbnail image display apparatus 100.

FIG. 2 is a figure illustrating an example of a schematic configuration of the thumbnail image display apparatus 100.

In addition to the above configuration, the thumbnail image display apparatus 100 includes an input apparatus 130, an imaging apparatus 140, an AFE (Analog Front End) 150, an image memory 160, an interface apparatus 170, a storage apparatus 180, a CPU (Control Processing Unit) 190, etc.

The input apparatus 130 detects operation performed by a user with the display apparatus 120, and outputs the detected content as a signal with a certain interval. The display apparatus 120 and the input apparatus 130 may be configured to be integrated as a touch panel, etc.

The imaging apparatus 140 is an example of an imaging module. The imaging apparatus 140 has a reduction optical system type imaging sensor including an imaging element made of a CCD (Charge Coupled Device) arranged in a substantially straight line in the main scanning direction. This imaging sensor captures an image of a document, generates an analog image signal corresponding to each color of RGB, and outputs the analog image signals. Instead of the CCD, it is also possible to use a CIS (Contact Image Sensor) of an equal magnification optical system type having an imaging element based on CMOS (Complementary Metal Oxide Semiconductor).

The AFE 150 converts each analog value output from the imaging apparatus 140 into a digital value to generate pixel data and generates image data composed of each generated pixel data.

The image memory 160 includes a storage apparatus such as a non-volatile semiconductor memory, a volatile semi-conductor memory, and a magnetic disk. The image memory 160 saves the input image generated by the AFE 150.

The interface apparatus 170 includes an interface circuit conforming to a serial bus such as USB (Universal Serial Bus), and electrically connects with an external computer, etc., to transmit and receive image data and various kinds of information. Instead of the interface apparatus 170, it may also be possible to use a communication apparatus having an antenna for transmitting and receiving a radio signal and a radio communication interface circuit for transmitting and receiving a signal through a radio communication line according to a certain communication protocol. The certain communication protocol is, for example, a wireless LAN (Local Area Network).

The storage apparatus 180 is an example of a storage. The storage apparatus 180 includes a memory apparatus such as RAM (Random Access Memory), ROM (Read Only Memory), etc., a fixed disk apparatus such as a hard disk, or a portable storage apparatus such as a flexible disk or an optical disk. The storage apparatus 180 stores computer programs, databases, tables, etc., used for various processing of the thumbnail image display apparatus 100. The computer program may be installed on the storage apparatus 180 from a computer readable, non-transitory medium such as a compact disk read only memory (CD-ROM), a digital versatile disk read only memory (DVD-ROM), or the like by using a well-known setup program or the like.

The storage apparatus 180 includes a storage area 185 in which thumbnail image data and image data are stored in association with each other and a display memory 186 corresponding to a single display screen (the storage area 185 and the display memory 186 are not illustrated). It should be noted that the image data is image data generated by the AFE 150, and the thumbnail image data may be thumbnail image data generated based on the image data generated by the AFE 150.

The CPU 190 operates in accordance with the program stored in advance in the storage apparatus 180. Instead of the CPU 190, a DSP (digital signal processor), an LSI (large scale integration) device, etc., may be used. Instead of the CPU 190, an application specific integrated circuit (ASIC), a field-programmable gate array (FPGA), etc., may be used.

The CPU 190 is connected to the input apparatus 130, the display apparatus 120, the imaging apparatus 140, the AFE 150, the image memory 160, the interface apparatus 170, the storage apparatus 180, etc., and the CPU 190 controls each of the input apparatus 130, the display apparatus 120, the imaging apparatus 140, the AFE 150, the image memory 160, the interface apparatus 170, the storage apparatus 180, etc. The CPU 190 performs document reading control of the imaging apparatus 140 and data transmission and reception control with an external computer, etc., through the interface apparatus 170.

Figures 3, 4:
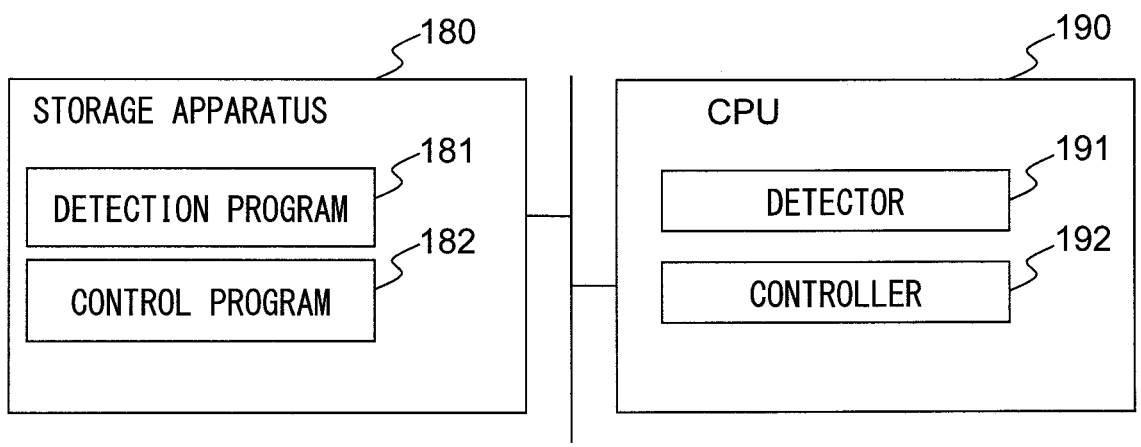
FIG. 3 is a figure illustrating an example of a schematic configuration illustrating a storage apparatus 180 and a CPU 190.
FIG. 4 is a figure illustrating an example of a correspondence table between identifiers and thumbnail images.

FIG. 3 is a figure illustrating an example of a schematic configuration of the storage apparatus 180 and the CPU 190.

As illustrated in FIG. 3, the programs such as a detection program 181 and a control program 182 are stored in the storage apparatus 180. Each of these programs is a function module implemented by software operating on the processor. The CPU 190 reads each program stored in the storage apparatus 180 and operates in accordance with each of the read programs. As a result, the CPU 190 functions as the detector 191 and controller 192.

FIG. 4 is a figure illustrating an example of a correspondence table between identifiers and thumbnail images.

As illustrated in FIG. 4, the storage apparatus 180 stores multiple thumbnail images that can be displayed on the display apparatus 120 and identifiers corresponding to the thumbnail images in such a manner that the thumbnail images and the identifiers are associated with each other. Thumbnail images are identified by the file names of the thumbnail images. For example, the identifier indicates a page number of one of multiple documents that have been captured.

It should be noted that the identifier is not limited to numbers, and may be characters, symbols, etc. The correspondence between the thumbnail image and the identifier can also be realized by a method other than the one using the table, for example, a method using the main part of the filename of a thumbnail image (for example, when the filename of any given thumbnail image is 1.jpg, "1" is the main part of the filename) as an identifier.

Figure 5:
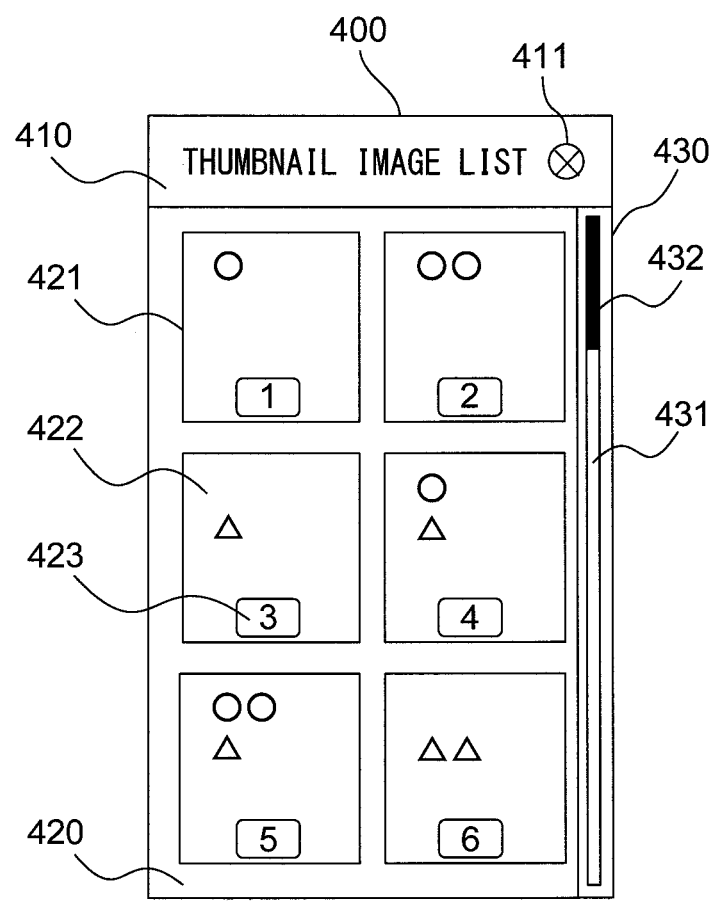
FIG. 5 is a figure illustrating an example of a display screen 400 displayed on a display apparatus 120.

FIG. 5 is a figure illustrating an example of a display screen 400 displayed on the display apparatus 120.

The display screen 400 includes a title display region 410, a thumbnail image display region 420, and a scroll display region 430. The title display region 410 is an area for displaying information relating to processing, etc., of the screen displayed. In the title display region 410, an end button 411 is provided, and when the end button 411 is selected, the display processing of the thumbnail images is terminated.

The thumbnail image display region 420 is an area displaying the thumbnail image display frames 421 and the thumbnail images 422, and the thumbnail image display region 420 is arranged under the title display region 410. A single thumbnail image 422 is displayed in a single thumbnail image display frame 421. A single thumbnail image 422 and a single thumbnail image display frame 421 may be displayed in one display screen 400. Alternatively, multiple thumbnail images 422 and multiple thumbnail image display frames 421 may be displayed in one display screen 400. In FIG. 5, six thumbnail images 422 and six thumbnail image display frames 421 are displayed in the display screen 400. An identifier display region 423 for displaying the identifier corresponding to the thumbnail image 422 in association with the thumbnail image 422 is arranged in the thumbnail image display frame 421.

The scroll display region 430 is an area displaying a scroll bar 431 and a slider 432, and the scroll display region 430 is arranged under the title display region 410 and at the right hand side of the thumbnail image display region 420. The scroll bar 431 corresponds to all of the selectable thumbnail images 422, and the slider 432 indicates where the thumbnail image 422 currently being displayed is located among all of the selectable thumbnail images 422.

In the following description, the horizontal direction of the display screen 400 may be referred to as an X direction, and the vertical direction may be referred to as a Y direction.

The display screen 400 illustrated in FIG. 5 is an example of an initial screen when displaying the thumbnail images 422 to start making a selection. A thumbnail image 422 corresponding to an identifier different from "1" such as a thumbnail image 422 corresponding to an identifier "7" or "10" may be displayed at the upper left of the thumbnail image display region 420.

Figure 6:
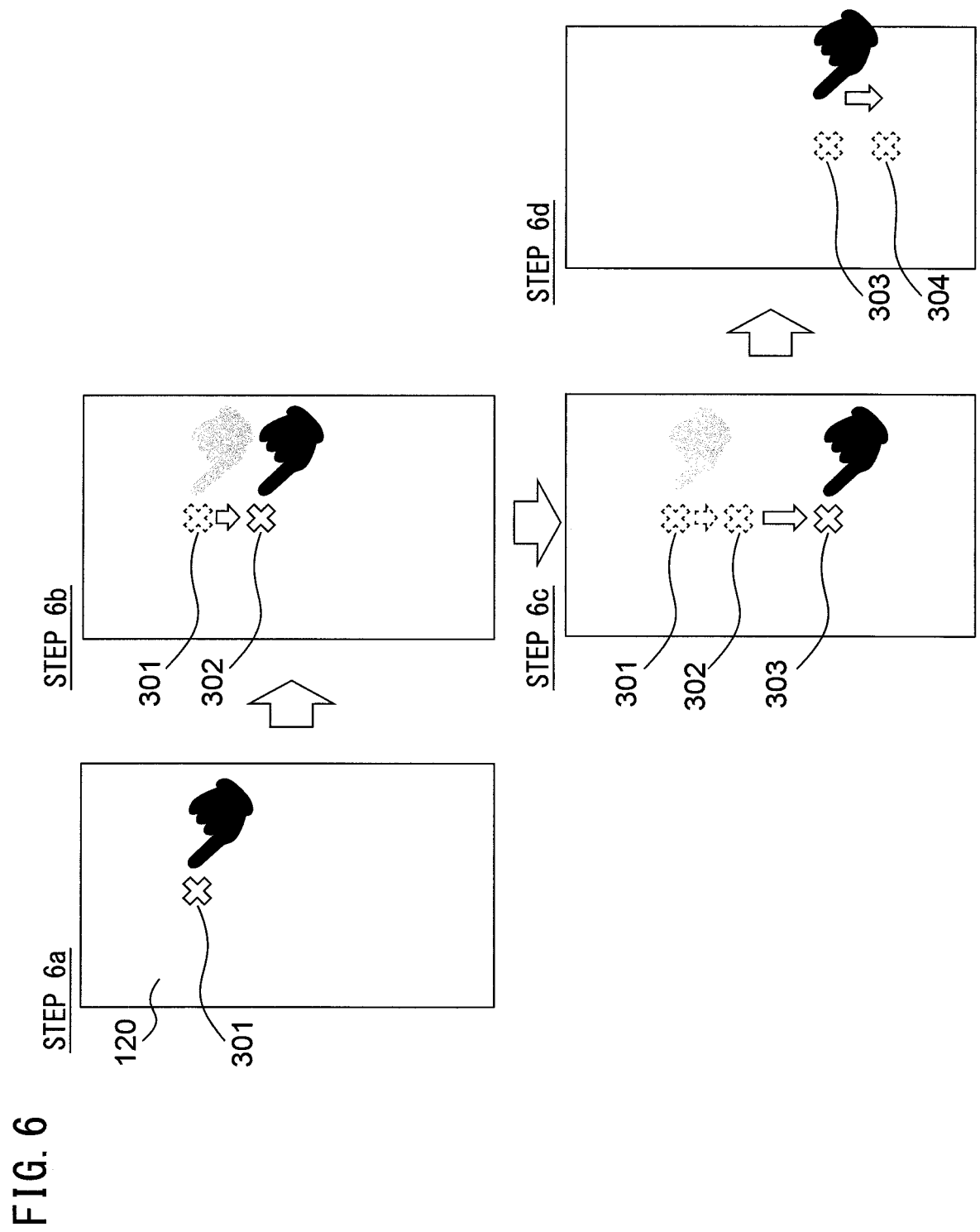
FIG. 6 is a figure illustrating an example of an operation sequence including a touch operation, a pan operation, and a flick operation.

FIG. 6 is a figure illustrating an example of an operation sequence including a touch operation, a pan operation, and a flick operation. The operation including a touch operation and a pan operation with the display apparatus 120 performed by the user is detected by the detector 191 on the basis of a signal output from the input apparatus 130 with a certain interval A.

<Touch Operation>

The touch operation means an operation in which the user touches the display apparatus 120 with a finger. The position touched with the finger is called a touch position.

When the user first touches the display apparatus 120 with his or her finger (step 6*a*), the input apparatus 130 outputs a signal including the coordinate values indicating the first touch position 301, which is the first touch position, to the detector 191. As a result, the detector 191 detects the start of the touch operation. When the position of the finger on the display apparatus 120 is moving (step 6*b*) upon next detection timing of a touch by the input apparatus 130, the input apparatus 130 outputs to the detector 191 a signal including coordinate values indicating the second touch position 302 which is the next touch position. The detector 191 detects that the user continues to perform the touch operation, and the coordinate values of the first touch position 301 and the coordinate values of the second touch position 302 are different. On the basis of these detections, the detector 191 detects the touch position has moved from the first touch position 301 to the second touch position 302. Thereafter, the detector 191 executes detection of a new touch position on the basis of the signal of the certain interval A output from the input apparatus 130.

<Pan Operation>

The pan operation means an operation of moving the finger to a position away from the initial touch position by a certain distance or more while keeping on touching the display apparatus 120. The pan operation is terminated when the finger is released from the display apparatus 120.

When the detector 191 detects, for the first time, that the touch operation is continuing and that the third touch position 303 which is a new touch position has moved by a certain distance B or more from the first touch position 301

(step 6c), the detector 191 detect the start of the pan operation. Thereafter, as long as the touch operation continues, the detector 191 determines that the pan operation is continuing.

When the user releases the finger from the display apparatus 120 at the position 304 (step 6d), the input apparatus 130 outputs, to the detector 191, a signal indicating that the finger is released and the coordinates of the position 304 where the finger is released. The detector 191 which receives the signal detects that the touch operation and the pan operation performed by the user have been finished.

<Flick Operation>

The flick operation means an operation in which the finger is released from the state of touching the display apparatus 120 and that the moving speed of the finger when the finger is released (the speed of the movement in a direction parallel to the plane of the display apparatus 120) is equal to or more than a certain speed.

When the user touches the display apparatus 120 at the third touch position 303 and releases his or her finger from the display apparatus 120 at the position 304 (step 6d) and that the moving speed of the finger when the finger is released is equal to or more than a certain speed D, then the detector 191 determines that the flick operation is performed. When the moving speed is equal to or more than the certain speed D, this means that the moving distance from the previous third touch position 303 (previous coordinates notified with the certain interval A) to the position 304 where the finger is released is equal to or more than the certain distance C.

In the present embodiment, the certain interval A with which the input apparatus 130 outputs signals, the certain distance B with which the controller 192 detects the start of the pan operation, and the certain distance C and the certain speed D with which the controller 192 detects the flick operation are as illustrated in Table 1. In the present embodiment, the screen size of the display apparatus 120 where a pan operation, a flick operation, etc., are performed is 272 pixels in width and 460 pixels in height.

TABLE 1

| Type of a certain value | Value |
|---|---|
| Certain interval A with which the input apparatus 130 outputs signals | 10 ms |
| Certain distance B with which the controller 192 detects start of a pan operation and starts displaying of the identifier 440 | 30 pixels |
| Certain distance C with which the controller 192 detects a flick operation | 20 pixels |
| Certain speed D with which the controller 192 detects a flick operation (= certain distance C/certain interval A) | 20 pixels/10 ms = 2000 pixels/second |
| Certain distance E with which the controller 192 changes the display of the identifier 440 | 5 pixels |
| Certain magnification F for calculating the change speed of the identifier 440 | 0.04 |
| Certain time G which is an interval with which the identifier 440 is updated | 100 ms |
| Certain pixel number H for reducing the change speed of the identifier 440 | 5 pixels |

Figure 7:
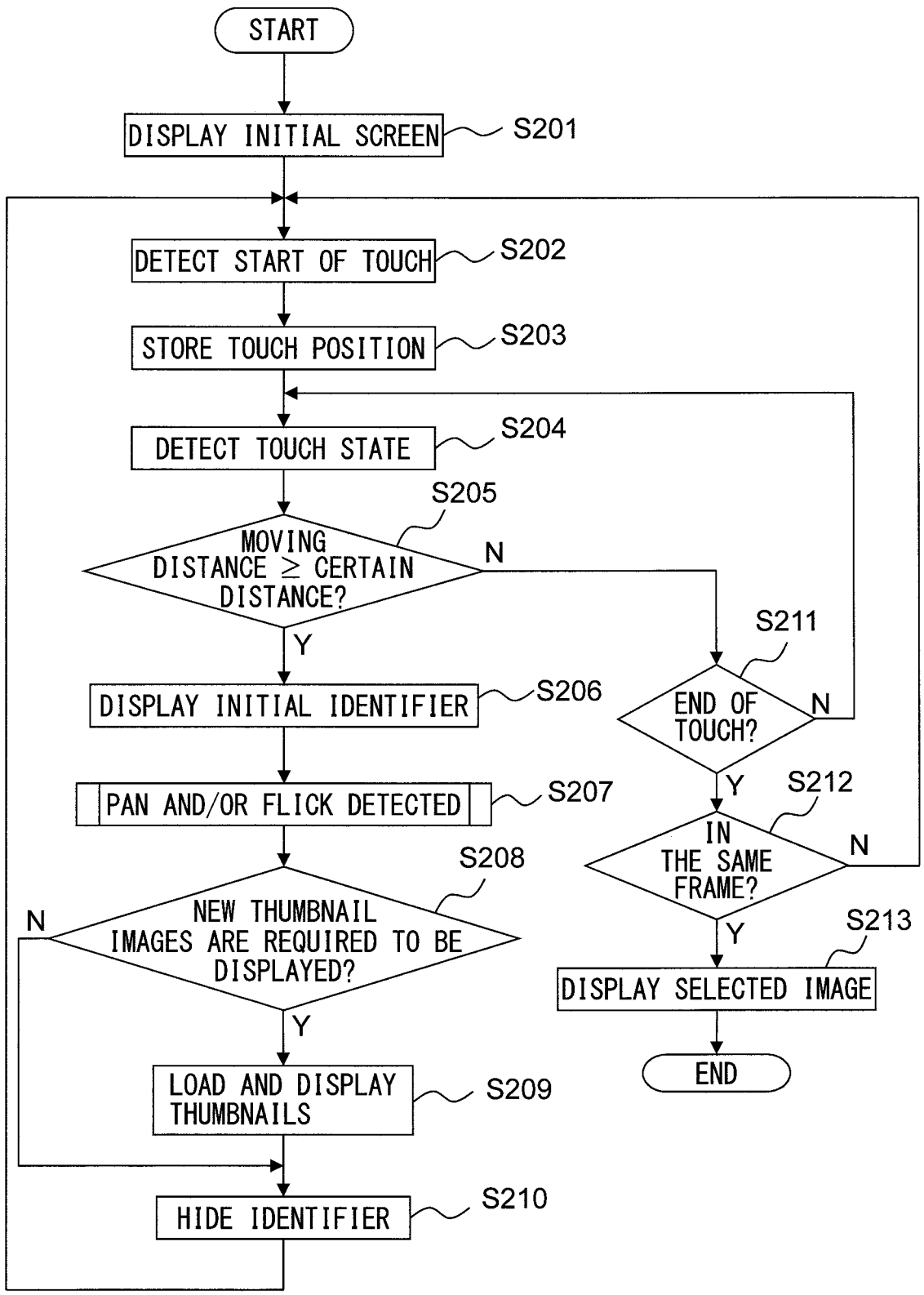
FIG. 7 is a flowchart illustrating an example of operation of thumbnail image display processing.
Figure 8:
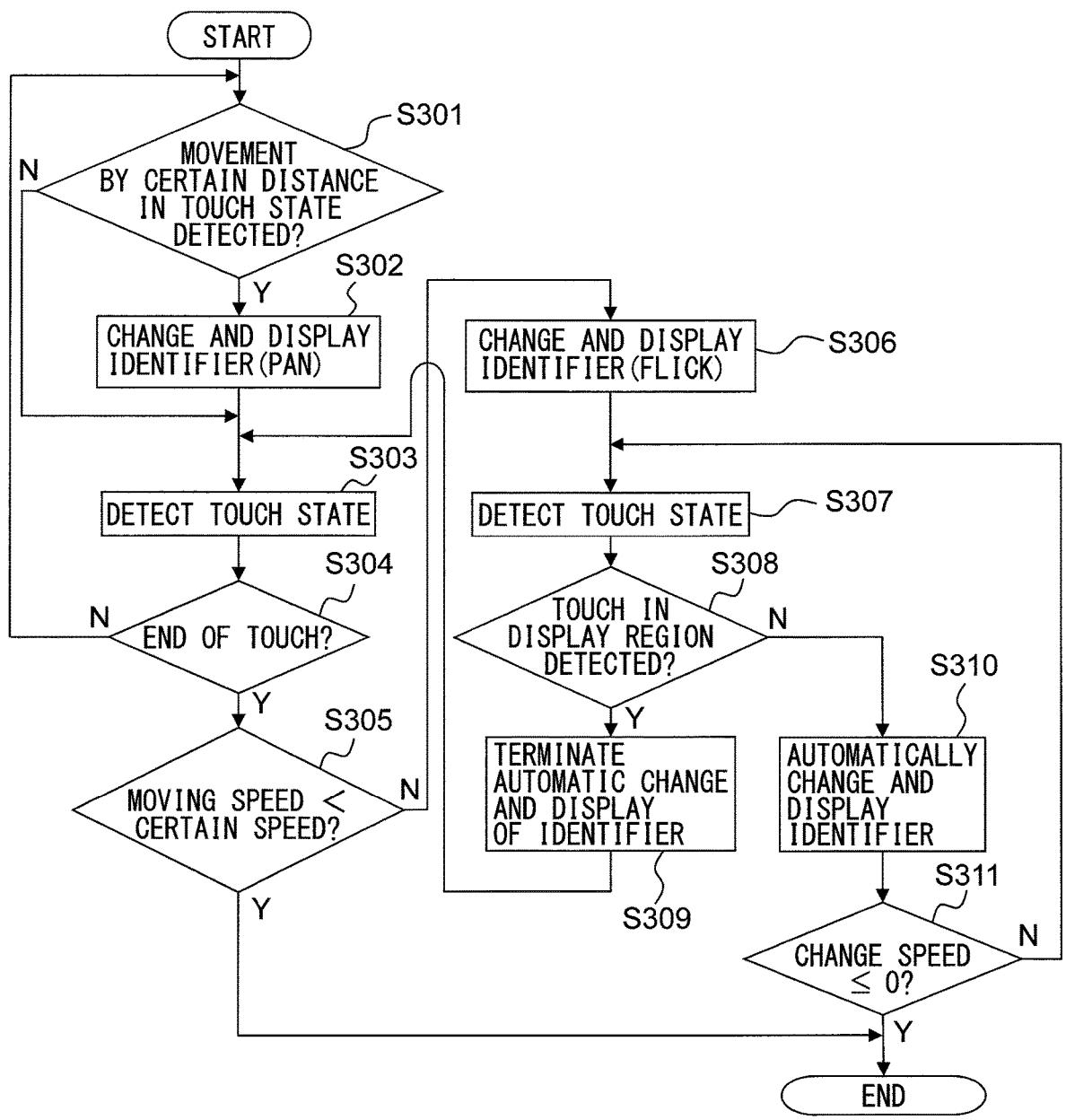
FIG. 8 is a flowchart illustrating an example of details of step S207 of FIG. 7.

FIG. 7 is a flowchart illustrating an example of operation of thumbnail image display processing, and FIG. 8 is a flowchart illustrating an example of details of step S207 of FIG. 7. FIG. 9 is a figure illustrating an example of transition of the display screen 400 in conjunction with a pan operation, and FIG. 10 is a figure illustrating an example of transition of the display screen 400 in conjunction with a flick operation. The operation of thumbnail image display processing will be hereinafter described below with reference to the flowcharts illustrated in FIG. 7 and FIG. 8 and the figure illustrating the transition of the display screen 400 illustrated in FIG. 9 and FIG. 10. It should be noted that the operation flow described below is executed mainly by the CPU 190 in cooperation with each element of the thumbnail image display apparatus 100 in accordance with the program stored in the storage apparatus 180 in advance.

First, the controller 192 uses the thumbnail image data stored in the storage apparatus 180 to display, on the display apparatus 120, the initial screen of the display screen 400 for selecting image data (step S201. See FIG. 5 for an example of the initial screen).

On the basis of the result obtained by the input apparatus 130 detecting the operation performed by the user, the detector 191 detects the start of the touch operation performed by the user with the thumbnail image display region 420 (step S202). When the detector 191 detects the start of the touch operation, the detector 191 stores the touch position in the storage apparatus 180, which is expressed by the coordinate values where the start of the touch operation is detected (step S203).

Subsequently, the detector 191 detects the state of touch (step S204). When the detector 191 detects continuation of the touch operation and a movement from the touch position in step S202 by the certain distance B or more (Y in step S205), the controller 192 displays the identifier 440 on the display apparatus 120 (step S206). In this case, the controller 192 displays the identifier 440 corresponding to any of the displayed thumbnail images 422 without changing the thumbnail images 422 displayed on the display apparatus 120. As for the certain distance B, see Table 1. Further, in the case of Y in step S205, the detector 191 detects the start of the pan operation.

An example of the display screen 400 displayed on the display apparatus 120 in step S206 is illustrated in step 9b of FIG. 9. In the example of step 9b in FIG. 9, the identifier 440 corresponding to the first thumbnail image is displayed in the rectangle in the center of the thumbnail image display region 420. The background of the identifier 440 is a transparent color, and the thumbnail image 422, etc., which are originally displayed are visible through the background portion of the identifier 440. The controller 192 performs this display by using, for example, the multi-layer display function provided in the display apparatus 120. By decreasing the size of the identifier 440 to a size smaller than the thumbnail image display region 420, the computational processing amount of the update processing of screen display can be reduced when the identifier changes. Further, the background of the identifier 440 may be set as a non-transparent color.

Subsequently, until the touch operation detected by the detector 191 is finished, the controller 192 determines whether a flick operation occurs or not on the basis of the state of the touch, and changes the content displayed on the display screen 400 in conjunction with a pan operation and a flick operation (step S207). The details of this determination and change will be described later with reference to FIG. 8.

The state after execution of step S207 is classified into the following three cases.

(1) A case where an identifier 440 different from the identifier 440 displayed in step S206 is displayed, and accordingly, thumbnail images 422 displayed after the execution of step S207 include new thumbnail images 422 which were not displayed in step S204.

(2) A case where an identifier 440 different from the identifier 440 displayed in the step S206 is displayed, but thumbnail images 422 displayed after the execution of step S207 are the same as the thumbnail images 422 displayed in step S204.

(3) A case where the same identifier 440 as the identifier 440 displayed in step S206 is displayed, and accordingly, thumbnail images 422 displayed after the execution of step S207 are the same as the thumbnail images 422 displayed in step S204.

In the case of (1), i.e., the case where new thumbnail images 422 are displayed on the display apparatus 120 (Y in step S208), the controller 192 loads, to the display memory 186, the image data of the thumbnail images included in the display screen 400 from the storage area 185 of the storage apparatus 180. Then, the controller 192 uses the data loaded in the display memory 186 to display a new display screen 400 on the display apparatus 120 (step S209). For example, when the detector 191 detects the end of the pan operation in step S207, the controller 192 reads the thumbnail images 422 corresponding to the identifier 440 displayed on the display apparatus 120 from the storage apparatus 180 and displays the thumbnail images 422 on the display apparatus 120. When the controller 192 terminates the change and display of the identifier 440 in conjunction with the flick operation in step S207, the controller 192 reads the thumbnail images 422 corresponding to the identifier 440 displayed on the display apparatus 120 from the storage apparatus 180 and displays the thumbnail images 422 on the display apparatus 120.

In the cases of (2) and (3), i.e., the case where new thumbnail images are not to be displayed on the display screen 400 (N in step S208), the controller 192 does not perform the operation of step S209 explained above.

In the example of (2), the value of the identifier 440 is close to the end or the start of all of the stored identifiers, so that even when the value of the identifier 440 is changed, a set of thumbnail images 422 that are the same as those displayed in step S204 are displayed in step S209. For example, the set of thumbnail images 422 displayed in steps S204 to S206 correspond to the identifiers "25" to "30"; the identifier displayed in step S206 is "25"; the identifier displayed as a result of execution of step S207 is changed from "25" to "30"; and the finger is released while "30" is displayed. In this case, although the identifier 440 is changed, the thumbnail images 422 displayed after the execution of step S207 are still the thumbnail images 422 corresponding to the values of the identifiers "25" to "30".

Subsequently, the controller 192 hides the identifier 440 (step S210), and the processing returns back to the detection of start of the touch in step S202. Display screen 400 of step 9*d* in FIG. 9 is an example of a display screen 400 displayed on the display apparatus 120 in step S210 after the pan operation is executed in step S207 of FIG. 7. Display screen 400 of step 10*e* in FIG. 10 is an example of a display screen 400 displayed on the display apparatus 120 in step S210 after the flick operation is executed in step S207 of FIG. 7.

When the determination result in step S205 is N after the processing of step S202 to step S204, the controller 192 determines whether or not the detector 191 has detected the end of the touch operation (step S211). When the determination result in step S205 is N, this means that the detector 191 does not detect a movement from the touch position in step S202 by the certain distance B or more. As for the certain distance B, see Table 1.

When the detector 191 does not detect the end of the touch operation (N in step S211), the processing returns back to step S204, and the detector 191 detects a new state of touch.

When the end of the touch operation is detected (Y in step S211), the controller 192 determines whether the touch position in step S202 and the last touch position in step S204 are in the same thumbnail image display frame 421 (step S212).

If the touch position in step S202 and the last touch position in step S204 are not in the same thumbnail image display frame 421 (N in step S212), the processing returns back to step S202, and the detector 191 detects the start of the touch operation.

When the touch position in step S202 and the last touch position in step S204 are in the same thumbnail image display frame 421 (Y in step S212), the controller 192 determines that the thumbnail image 422 in the thumbnail image display frame 421 is selected. Then, the controller 192 reads the image data corresponding to the thumbnail image 422 from the storage apparatus 180 to the display memory 186 and displays the image data on the display apparatus 120 (step S213). Thus, the series of steps is finished.

Display screen 400 of step 9*e* in FIG. 9 is an example of a display screen 400 displayed on the display apparatus 120 when the thumbnail images 422 corresponding to the identifier "10" are selected in step S213 while the display screen 400 of step 9*d* in FIG. 9 is displayed on the display apparatus 120.

Display screen 400 of step 10*f* in FIG. 10 is an example of a display screen 400 displayed on the display apparatus 120 when the thumbnail images 422 corresponding to the identifier "14" are selected in step S213 while the display screen 400 of step 10*e* in FIG. 10 is displayed on the display apparatus 120.

FIG. 8 is a flowchart illustrating the details of step S207 in FIG. 7. Determination as to whether a flick operation occurs or not and an operation for changing the content displayed on the display screen 400 in conjunction with a pan operation and a flick operation will be hereinafter explained with reference to the flowchart illustrated in FIG. 8.

First, when the detector 191 detects a movement from the touch position in step S202 by the certain distance E or more (Y in step S301), the detector 191 detects the moving direction and the moving distance from the touch position in step S202, and the controller 192 changes the identifier 440 (step S302). More specifically, when the detector 191 detects the touch operation in step S202 and then detects the pan operation in Y of step S205, the identifier 440 is changed and displayed in accordance with the moving direction and the moving distance of the pan operation. Display screen 400 of step 9*c* in FIG. 9 is an example of a display screen 400 displayed on the display apparatus 120 in step S302. In the example of step 9*c* in FIG. 9, the user performs the pan operation in the upward direction in step 9*c* of FIG. 9, so that the identifier 440 increases from 1 to 2, 3 . . . , and finally, 10 is displayed. As for the certain distance E, see Table 1.

In step S302, the controller 192 may determine the moving direction or calculate the moving distance on the basis of only a component of the direction in which the slider 432 is able to slide (a component in the Y direction) on the display screen 400 of step 9*a* in FIG. 9. The relationship between the moving direction of the finger and the increase and decrease of the identifier 440 may be a relationship in which, when the touched finger is moved upward, the value of the identifier 440 is decreased, and when the touched finger is moved downward, the value of the identifier 440 is increased. The increase and decrease in the value of the identifier 440 may be associated with the movement in the horizontal direction of the touch position, so that, for example, when the touched finger is moved to the right, the value of the identifier 440 increases, and when the touched finger is moved to the left, the value of the identifier 440 decreases.

Subsequently, the detector 191 detects the state of the touch (step S303). When the detector 191 does not detect the end of the touch operation (N in step S304), the processing returns back to step S301.

When the detector 191 detects the end of the touch operation, i.e., the finger is released (Y in step S304), the controller 192 determines whether or not the moving speed calculated based on the amount of a movement from the touch position notified from the detector 191 immediately before the finger is released to the position where the finger is released is slower than the certain speed D (step S305). When the moving speed is slower than the certain speed D (Y in step S305), the detector 191 detects the end of the pan operation, and as a result, the processing in step S207 is finished. As for the certain distance D, see Table 1.

When the moving speed is equal to or more than the certain speed D (N in step S305), the detector 191 detects the flick operation as well as the end of the pan operation, and the controller 192 changes the identifier 440 (step S306). More specifically, when the detector 191 detects a touch operation in step S202 and then detects a flick operation in step S305, the controller 192 changes the identifier 440 in accordance with the moving direction and the moving speed of the flick operation, and displays the identifier 440 on the display apparatus 120. Display screen 400 of step 10c in FIG. 10 is an example of a display screen 400 displayed on the display apparatus 120 in step S302. In the example of step 10c in FIG. 10, the user performs the flick operation in the upward direction in step 10b of FIG. 10, so that the identifier 440 increases from 1 to 2, 3 . . . , and finally, 10 is displayed. The flick operation may be detected subsequently to the pan operation, or may be detected without detecting any pan operation.

Subsequently, the detector 191 detects the state of the touch (step S307). When the detector 191 detects a touch operation with the thumbnail image display region 420 (Y in step S308), the controller 192 terminates the change processing of the identifier 440 in conjunction with the flick operation (step S309), and the processing returns back to S303. The change processing of the identifier 440 in accordance with a flick operation will be explained later as an explanation about step S310. In step S309, after the flick operation is detected, the change of the identifier 440 is enabled until the touch operation is detected.

In the case where the detector 191 does not detect a touch operation with the thumbnail image display region 420 (N in step S308), the controller 192 automatically changes the identifier 440 with every certain time G, and also changes the speed for changing the identifier 440 (step S310). The speed for changing the identifier 440 will be described later. Display screen 400 of step 10c in FIG. 10 is an example of a display screen 400 displayed on the display apparatus 120 in step S310 of FIG. 8. As for the certain distance D, see Table 1.

Figure 14:
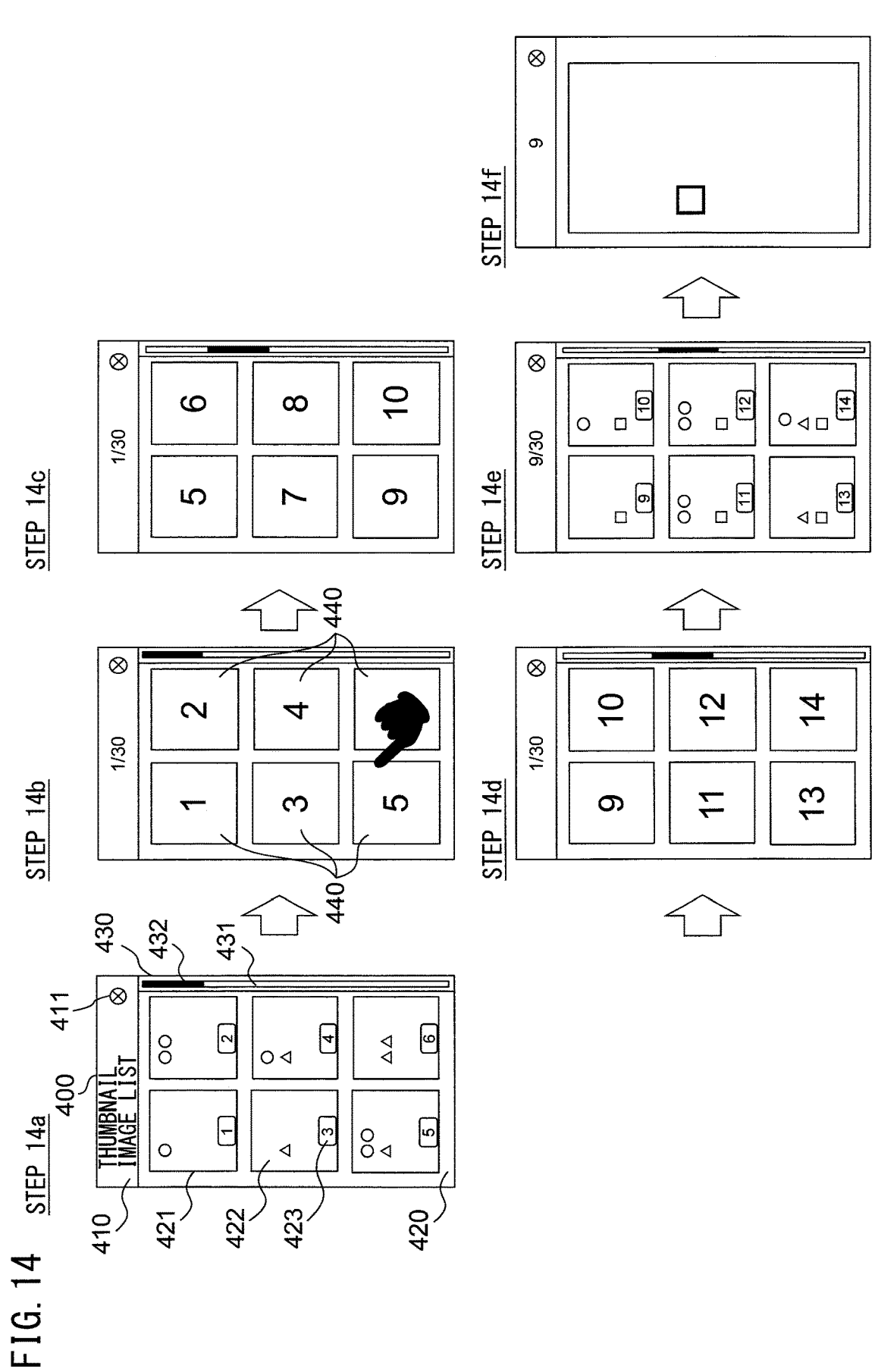
FIG. 14 is a figure illustrating an example of transition of the display screen 400 in conjunction with a flick operation.

When the new change speed that is changed in step S310 is more than zero (N in step S311), the processing returns back to step S307. When the new change speed is equal to or less than zero (Y in step S311), the controller 192 terminates the change of the identifier 440. Display screen 400 of step 10d in FIG. 10 is an example of a display screen 400 displayed on the display apparatus 120 when the change of the identifier 440 is terminated. In the example of step 10d in FIG. 10, the identifier 440 is automatically changed after step 10c in FIG. 10, and 14 is displayed when the change speed becomes equal to or less than zero.

As described above, the processing of step S207 is executed, and the display processing of the thumbnail images is realized in accordance with the flowchart as illustrated in FIG. 7 and FIG. 8. In particular, in step S302 and step S306, only the identifier 440 is changed without displaying new thumbnail images 422, and the new thumbnail images 422 are displayed after the identifier 440 has been changed. Therefore, it is not necessary to load thumbnail images corresponding to the displayed identifiers 440 from the storage apparatus 180 during the change of the identifiers 440 in conjunction with the pan operation or the flick operation, and the thumbnail images can be preferably displayed even if the memory capacity is small.

The present embodiment explained an example in which both the pan operation and the flick operation are detected, but the present embodiment is not limited thereto, and only the pan operation or only the flick operation may be detected.

In the present embodiment, the moving direction and the moving distance are used as a movement information for changing the identifier in the pan operation, but the present embodiment is not limited thereto, and only the moving direction or only the moving distance may be used. Likewise, the moving direction and the moving distance are used as the movement information for changing the identifier in the flick operation, but the present embodiment is not limited thereto, and only the moving direction or only the moving distance may be used.

When the pan operation is finished in step S207 or when the change and display of the identifier 440 in conjunction with the flick operation is terminated, the display position of the thumbnail image corresponding to the identifier 440 that was being displayed is not limited to the upper left corner, but may be at other positions. For example, in accordance with the rule that a thumbnail image corresponding to an odd number identifier is displayed at the left and a thumbnail image corresponding to an even number identifier is displayed at the right, a thumbnail image corresponding to the identifier "9" may be displayed at the upper left corner of step 9d in FIG. 9, and a thumbnail image corresponding to the identifier "10" may be displayed at the upper right corner of step 9d in FIG. 9. It may be possible to display a thumbnail image corresponding to an identifier before the identifier displayed when the pan operation is finished or when the change and display of the identifier 440 in conjunction with the flick operation is terminated.

The change of the identifier 440 in step S306 is executed according to the calculation methods (a) and (b) below.

(a) Increase and decrease direction of the identifier: when the component in the Y direction decreases in the movement from the touch position immediately before the finger is released to the position where the finger is released, the value of the identifier is increased, and when the component increases, the value of the identifier is decreased.

(b) Value of the identifier: the moving speed of the finger is calculated on the basis of the amount of a movement from the touch position immediately before the finger is released to the position where the finger is released, and further, on the basis of the value obtained by multiplying the moving speed by the certain magnification F, the initial speed (how many pixels the movement is made in the certain time G) of the automatic display change (inertia movement) is determined. In this case, an accumulative moving distance is derived from the change speed (speed derived from the initial speed and the deceleration rate (=certain pixel number H/certain time G)) and the elapsed time, and the value of the identifier can be calculated from this moving distance. See Table 1 for the certain magnification F, the certain time G, and the certain pixel number H.

For example, the processing in step S310 is executed by causing the controller 192 to decrease the certain pixel number H from the pixel number for calculating the speed (how many pixels the movement is made in the certain time G) with every certain time G. Therefore, the change of the identifier 440 can be terminated even if the user does not touch the display apparatus 120 again after the flick operation. See Table 1 for the certain time G and the certain pixel number H.

Second Embodiment

FIG. 11 is a figure illustrating an example of transition of a display screen 400 in conjunction with a pan operation. Except for the features explained below, the processing performed in the second embodiment is basically the same as the processing performed in the first embodiment.

Display screen 400 of step 11a in FIG. 11 is an example of an initial screen in step S201 of FIG. 7. The display screen 400 of step 11a in FIG. 11 does not include the scroll display region 430, the scroll bar 431, and the slider 432 of step 9a in FIG. 9.

Display screen 400 of step 11b in FIG. 11 is an example of a display screen 400 in step S206 of FIG. 7. In step S206, the controller 192 displays the thumbnail image display region 420 of step 11b in FIG. 11 with a lower brightness than the thumbnail image display region 420 of step 11a in FIG. 11.

The controller 192 displays the identifier 440 and the background bar 451 of step 11b in FIG. 11 in such a manner that the identifier 440 and the background bar 451 of step 11b in FIG. 11 are overlaid on the thumbnail image display region 420. At this occasion, the controller 192 determines the positions of the identifier 440 and the background bar 451 in such a manner that the positions are not overlaid on the touch position detected in step S204 of FIG. 7. The identifier 440 is an identifier corresponding to any one of the thumbnail images 422 displayed on the display apparatus 120. The background bar 451 is a figure assigned with a position corresponding to each of multiple identifiers stored in the storage apparatus 180. In the present embodiment, an identifier "1" is assigned to the top portion of the background bar 451, and an identifier "30" is assigned to the bottom portion of the background bar 451.

Display screen 400 of step 11c in FIG. 11 is an example of a display screen 400 in step S302 of FIG. 8. In step S302, the controller 192 displays the identifier 440, which is changed in accordance with the moving direction and the moving distance of the pan operation, at a corresponding position in the figure of the background bar 451, so that the display screen 400 is generated.

The controller 192 displays the identifier 440, which is changed in accordance with the moving direction and the moving distance of the pan operation, at a fixed position in the screen of the display apparatus 120, and moves and displays the figure of the background bar 451 in accordance with the moving direction and the moving distance of the pan operation. For example, when the upward movement of the touch position of the finger is detected in the state of step 11b in FIG. 11, the controller 192 increases the value of the identifier 440 from 1 to 10 in accordance with the moving distance and moves the position of the background bar 451 upward. At this occasion, the position of the identifier 440 is the same as the position in step 11b of FIG. 11, and the identifier 440 is placed at the position corresponding to the identifier "10" of the background bar 451. The moving range of the background bar 451 is caused to be smaller than the range of thumbnail image display region 420, so that the computation processing amount of update processing of the screen display can be reduced when the identifier 440 is changed.

Display screen 400 of step 11d in FIG. 11 is an example of a display screen 400 displayed on the display apparatus 120 in step S210 after the pan operation is executed in step S207 of FIG. 7. In this example, six thumbnail images 422 are displayed, which includes the thumbnail image corresponding to the identifier "10" displayed in step 11c of FIG. 11.

Display screen 400 of step 11e in FIG. 11 is an example of a display screen 400 displayed on the display apparatus 120 when the thumbnail image 422 corresponding to the identifier "10" is selected in step S213 while the display screen 400 of step 11d in FIG. 11 is displayed on the display apparatus 120.

Figure 12:
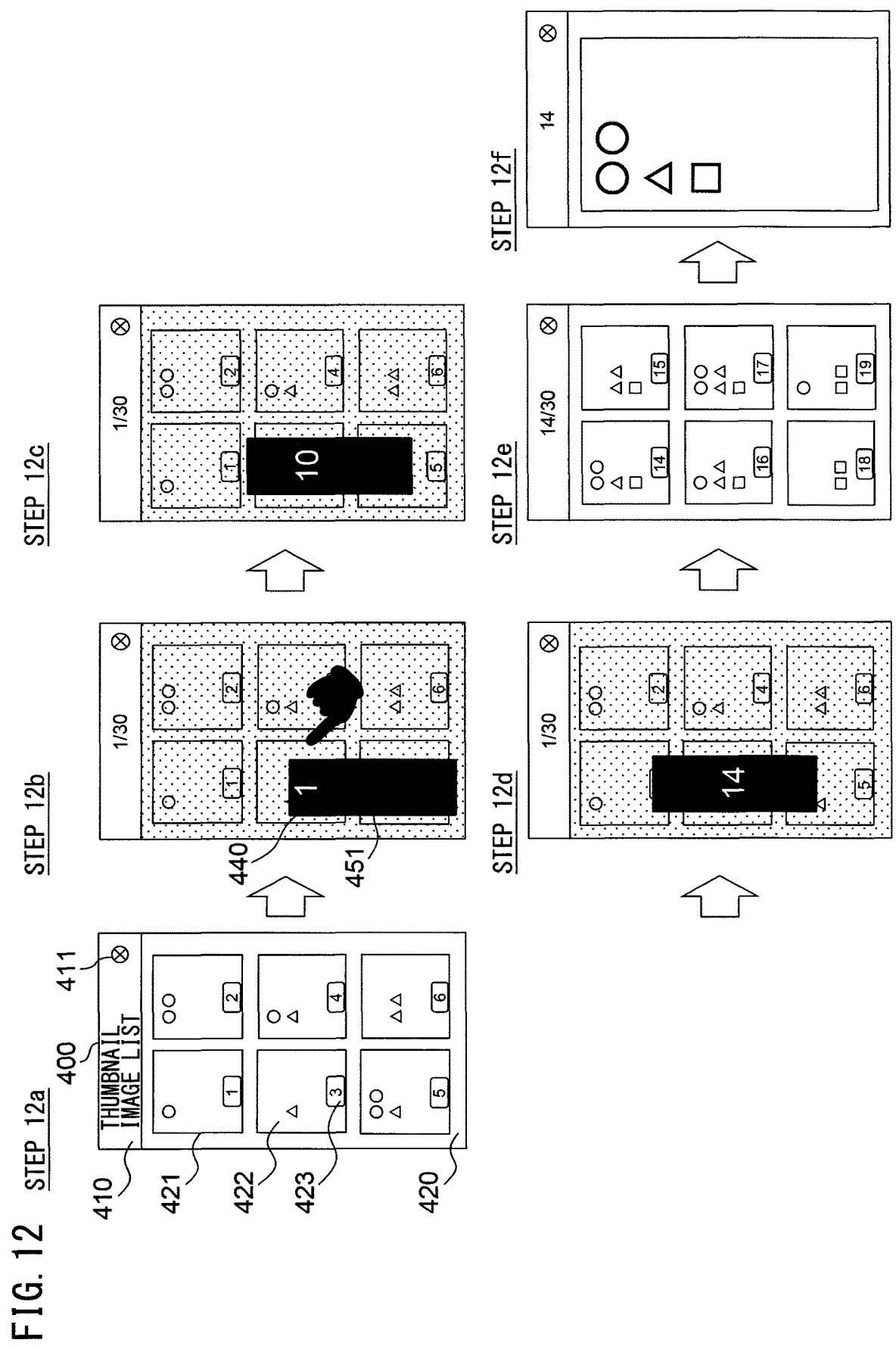
FIG. 12 is a figure illustrating an example of transition of the display screen 400 in conjunction with a flick operation.

FIG. 12 is a figure illustrating an example of transition of the display screen 400 in conjunction with a flick operation.

Display screen 400 of step 12c in FIG. 12 is an example of a display screen 400 in step S310 of FIG. 8. The display screen 400 of step 12c in FIG. 12 is different from the display screen 400 of step 11c in FIG. 11 in that the background bar 451 is moved in accordance with the moving direction and the moving speed of the flick operation. The other display methods are the same as those of FIG. 11.

As described above in details, even with an operation according to the content explained in the second embodiment, the thumbnail image display apparatus 100 does not need to load from the storage apparatus 180 the thumbnail images corresponding to the identifiers 440 displayed when the pan operation or the flick operation is performed. As a result, the thumbnail images can be preferably displayed even if the memory capacity is small. The second embodiment differs from the first embodiment in that the background bar 451 that can be slid according to the value of the identifier 440 is displayed when the identifier 440 is displayed.

Third Embodiment

FIG. 13 is a figure illustrating an example of transition of the display screen 400 in conjunction with a pan operation. Except for the features explained below, the processing performed in the third embodiment is the same as the processing performed in the first embodiment.

Display screen 400 of step 13a in FIG. 13 is an example of an initial screen in step S201 of FIG. 7. This screen is the same as the screen of step 9a in FIG. 9.

Display screen 400 of step 13b in FIG. 13 is an example of a display screen 400 in step S206 of FIG. 7. In step S206, the controller 192 switches the display of the thumbnail images displayed on the display apparatus 120 when the movement in step S205 was detected, to the display of only the identifiers 440 corresponding to the thumbnail images, and displays the identifiers 440 on the display apparatus 120. More specifically, the thumbnail images 422 and identifier display regions 423 which were being displayed in the thumbnail image display frame 421 are switched to the identifiers 440 corresponding to the thumbnail images, and the identifiers 440 are displayed.

Display screen 400 of step 13*c* in FIG. 13 is an example of a display screen 400 in step S302 of FIG. 8. In step S302, when the controller 192 detects a pan operation upon detecting a touch operation, the controller 192 changes the identifiers 440 in accordance with the moving direction and the moving distance of the pan operation, and displays the identifiers 440 on the display apparatus 120. For example, when the controller 192 detects the upward movement of the touch position of the finger, the controller 192 increases the value of the identifier 440 displayed in each thumbnail image display frame 421 in accordance with the moving distance. The controller 192 may change the display position of the slider 432 in accordance with the moving distance.

Display screen 400 of step 13*d* in FIG. 13 is an example of a display screen 400 displayed on the display apparatus 120 in step S210 after the pan operation is executed in step S207 of FIG. 7. In this example, six thumbnail images 422 are displayed, which correspond to the identifiers "9" to "14" displayed in step 13*c* of FIG. 13.

Display screen 400 of step 13*e* in FIG. 13 is an example of a display screen 400 displayed on the display apparatus 120 when the thumbnail image 422 corresponding to the identifier "9" is selected in step S213 while the display screen 400 of step 13*d* in FIG. 13 is displayed on the display apparatus 120.

FIG. 14 is a figure illustrating an example of transition of the display screen 400 in conjunction with a flick operation.

Display screen 400 of step 14*c* in FIG. 14 is an example of the display screen 400 in step S310 of FIG. 8. This example is different from the display screen 400 of step 13*c* in FIG. 13 in that the value of the identifier 440 displayed in each thumbnail image display frame 421 changes in accordance with the moving direction and the moving speed of the flick operation. The other display methods are the same as those of FIG. 13.

As described above in details, even with an operation according to the content explained in the third embodiment, the thumbnail image display apparatus 100 does not need to load from the storage apparatus 180 the thumbnail image corresponding to the identifier 440 displayed when the pan operation or the flick operation is performed. As a result, the thumbnail images can be preferably displayed even if the memory capacity is small. The third embodiment differs from the first embodiment in that the identifiers 440 are displayed and changed by erasing the thumbnail images 422.

Fourth Embodiment

Figure 15:
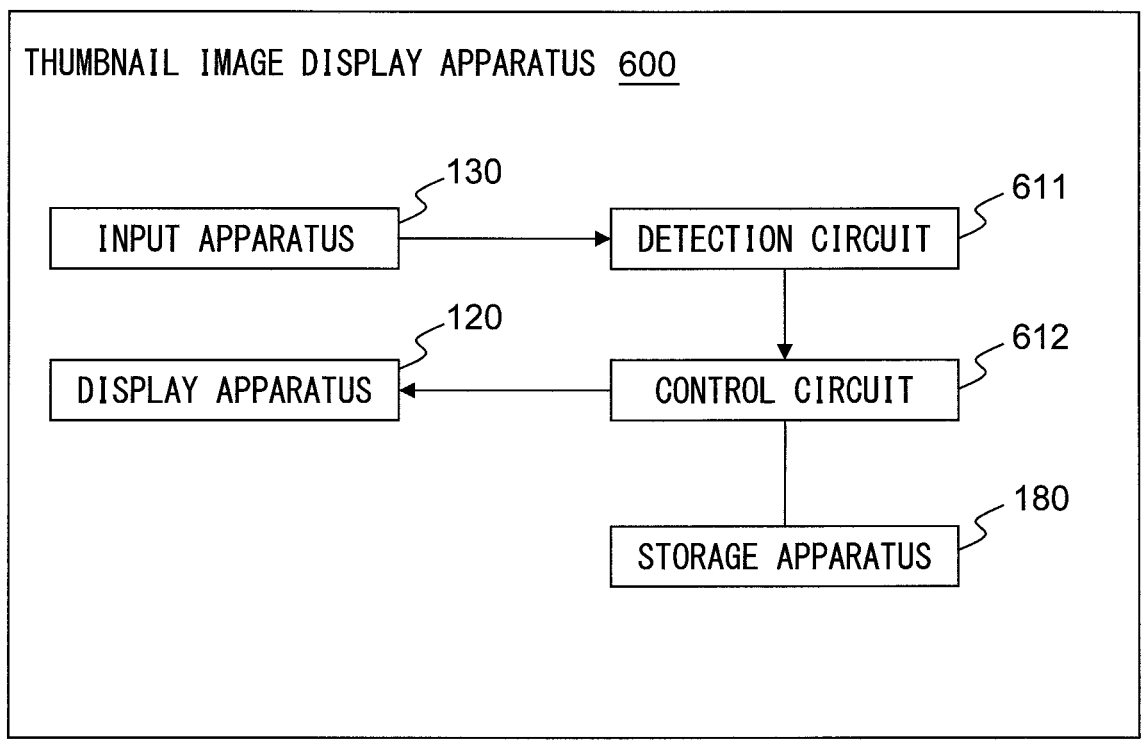
FIG. 15 is a block diagram illustrating an example of a schematic configuration of another thumbnail image display apparatus 600.

FIG. 15 is a block diagram illustrating an example of a schematic configuration of another thumbnail image display apparatus 600.

The thumbnail image display apparatus 600 includes a display apparatus 120, an input apparatus 130, a storage apparatus 180, a detection circuit 611, a control circuit 612, etc. The display apparatus 120, the input apparatus 130, and the storage apparatus 180 are apparatuses performing functions similar to the display apparatus 120, the input apparatus 130, and the storage apparatus 180 of the thumbnail image display apparatus 100.

The detection circuit 611 and the control circuit 612 are circuits used instead of the CPU 190 of the thumbnail image display apparatus 100.

The detection circuit 611 is an example of a detector, and has the same function as the detector 191. The detection circuit 611 detects the signal from the input apparatus 130 and detects the pan operation, the flick operation, etc.

The control circuit 612 is an example of a controller, and has the same function as the controller 192. The control circuit 612 detects the signal from the detection circuit 611 and uses the data such as the thumbnail images 422 stored in the storage apparatus 180 to generate data of the display screen 400 including the display of the thumbnail images 422 and/or the identifiers 440, and transmit the data of the display screen 400 to the display apparatus 120.

As described above in details, even when the detection circuit 611 and the control circuit 612 are used, the thumbnail image display apparatus can preferably display the thumbnail images even if the memory capacity is small.

Although the preferred embodiments of the present invention have been described above, the present invention is not limited to these embodiments. For example, the thumbnail image display apparatus 100 is not limited to the scanner, and the thumbnail image display apparatus 100 may be any device that performs processing to select an image based on thumbnail images, such as embedded devices, e.g., an electronic camera, a smartphone, etc.

According to the embodiments, a thumbnail image display apparatus and a control method of the thumbnail image display apparatus capable of displaying thumbnails in a preferable manner even with a small memory capacity can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A thumbnail image display apparatus comprising:
a display;
a processor for detecting an operation including a touch operation and a pan operation performed by a user with the display; and
a storage for storing a plurality of thumbnail images that can be displayed on the display and a plurality of identifiers that respectively correspond to the thumbnail images in such a manner that respective thumbnail images and respective identifiers are associated with each other, wherein
the processor displays, on the display, an identifier corresponding to any one of displayed thumbnail images without changing the thumbnail images displayed on the display when the processor detects the touch operation and a movement from a touch position by a predetermined distance, wherein
the processor changes the identifier in accordance with movement information of the pan operation and displays the identifier at a fixed position in a screen of en the display, when the processor detects the pan operation upon detecting the touch operation, wherein
the processor reads, from the storage, a thumbnail image corresponding to the identifier displayed on the display and displays the thumbnail image on the display, when the processor detects an end of the pan operation, wherein the processor displays a bar on the display when the processor detects the pan operation so that the entire bar moves in accordance with the movement information of the pan operation, wherein the processor displays the identifier inside the bar at a fix position in the screen of the display, wherein each of a plurality of positions in the bar is assigned with a respective one of the plurality of identifiers stored in the storage, and wherein the processor moves the entire bar so that a position in the bar assigned with the identifier that is changed in accordance with the movement information of the pan operation is located at the fixed position.

2. The thumbnail image display apparatus according to claim 1, wherein the movement information of the pan operation includes a moving direction and a moving distance of the pan operation.

3. The thumbnail image display apparatus according to claim 1, wherein the processor further detects a flick operation performed by the user with the display, the processor displays, on the display, an identifier corresponding to any one of displayed thumbnail images without changing the thumbnail images displayed on the display when the processor detects the touch operation and the movement, the processor changes the identifier in accordance with the movement information of the flick operation and displays the identifier on the display, when the processor detects the flick operation upon detecting the touch operation, and the processor reads, from the storage, the thumbnail image corresponding to the identifier displayed on the display and displays the thumbnail image on the display, when changing and displaying of the identifier in conjunction with the flick operation is completed.

4. The thumbnail image display apparatus according to claim 1, wherein the processor displays, at the corresponding position in the bar, an identifier that is changed in accordance with the movement information of the pan operation.

5. The thumbnail image display apparatus according to claim 1, wherein the processor displays an identifier corresponding to a thumbnail image in association with the thumbnail image, when the processor displays the thumbnail image on the display.

6. A control method of a thumbnail image display apparatus including a display, the control method comprising:

storing a plurality of thumbnail images that can be displayed on the display and a plurality of identifiers that respectively correspond to the thumbnail images in such a manner that respective thumbnail images and respective identifiers are associated with each other;

detecting an operation including a touch operation and a pan operation performed by a user with the display;

displaying, on the display, an identifier corresponding to any one of displayed thumbnail images without changing thumbnail images displayed on the display when the touch operation and a movement from a touch position by a predetermined distance are detected;

changing the identifier in accordance with movement information of the pan operation and displaying the identifier at a fixed position in a screen of en the display, when the pan operation is detected upon detecting the touch operation;

displaying, on the display, a thumbnail image corresponding to the identifier displayed on the display, when an end of the pan operation is detected; and displaying a bar on the display, when the pan operation is detected so that the entire bar moves in accordance with the movement information of the pan operation, wherein the identifier is displayed inside the bar at a fix position in the screen of the display, wherein each of a plurality of positions in the bar is assigned with a respective one of the plurality of identifiers stored in the storage, and wherein the entire bar is moved so that a position in the bar assigned with the identifier that is changed in accordance with the movement information of the pan operation is located at the fixed position.

* * * * *